April 3, 1951　　　M. MORRISON　　　2,547,338
SQUARE-WAVE GENERATOR
Original Filed Sept. 10, 1943　　　2 Sheets-Sheet 1

INVENTOR.
Montford Morrison

Patented Apr. 3, 1951

2,547,338

UNITED STATES PATENT OFFICE 2,547,338

SQUARE-WAVE GENERATOR

Montford Morrison, Upper Montclair, N. J.

Substituted for application Serial No. 501,786, September 10, 1943. This application November 21, 1945, Serial No. 629,942

2 Claims. (Cl. 250—36)

This invention relates to generators of alternating currents producing special non-sinusoidal wave-forms, and in particular to those generators producing so-called square wave-forms and which are used in the study and testing of audio-circuit devices.

The present application is a substitute-continuation of application Serial No. 501,786, now abandoned, filed September 10, 1943.

Among the objects of the invention are: to provide an improved square-wave generator which has a self-contained source of fundamental frequency; to provide such a generator with an improved accuracy of calibration; to provide such a generator with an improved stability of frequency and amplitude; to provide a generator which can also generate triangular wave-forms of voltage and to provide a greatly simplified and less expensive device for accomplishing these functions.

Figure 1:
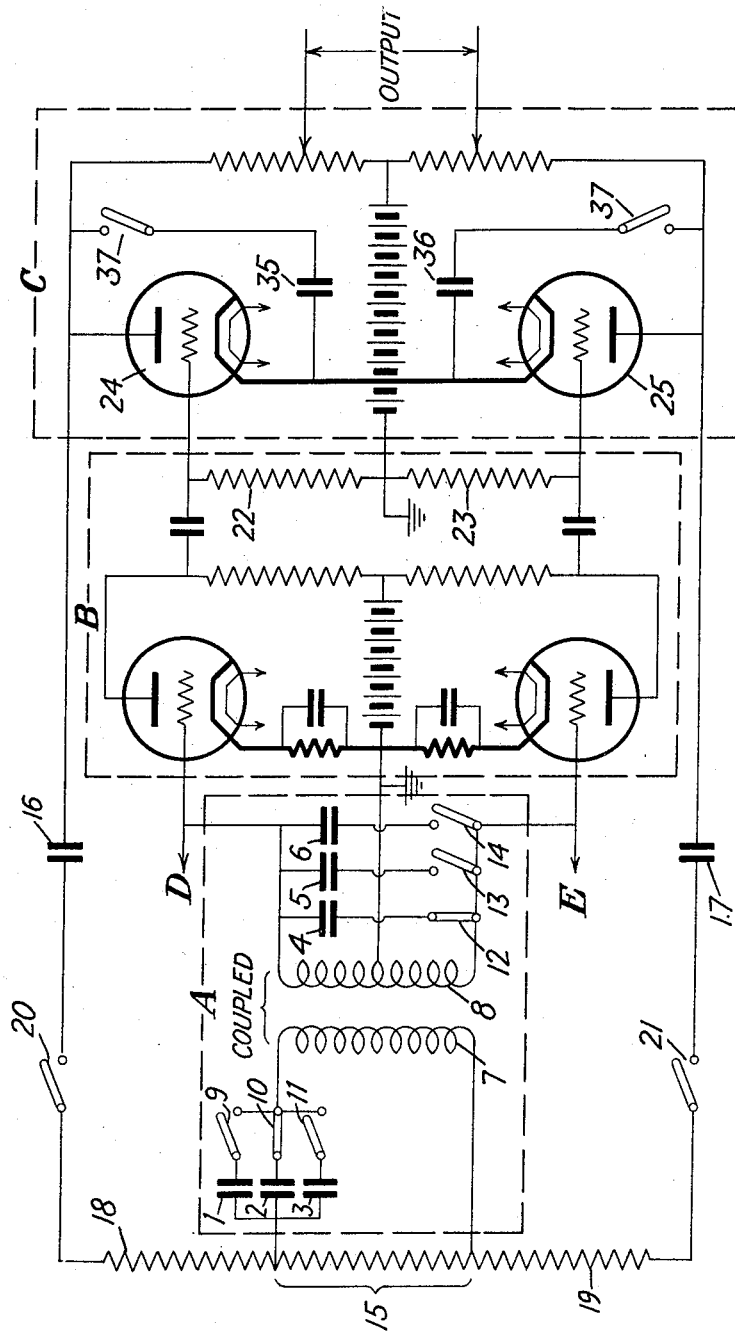
Figure 2:
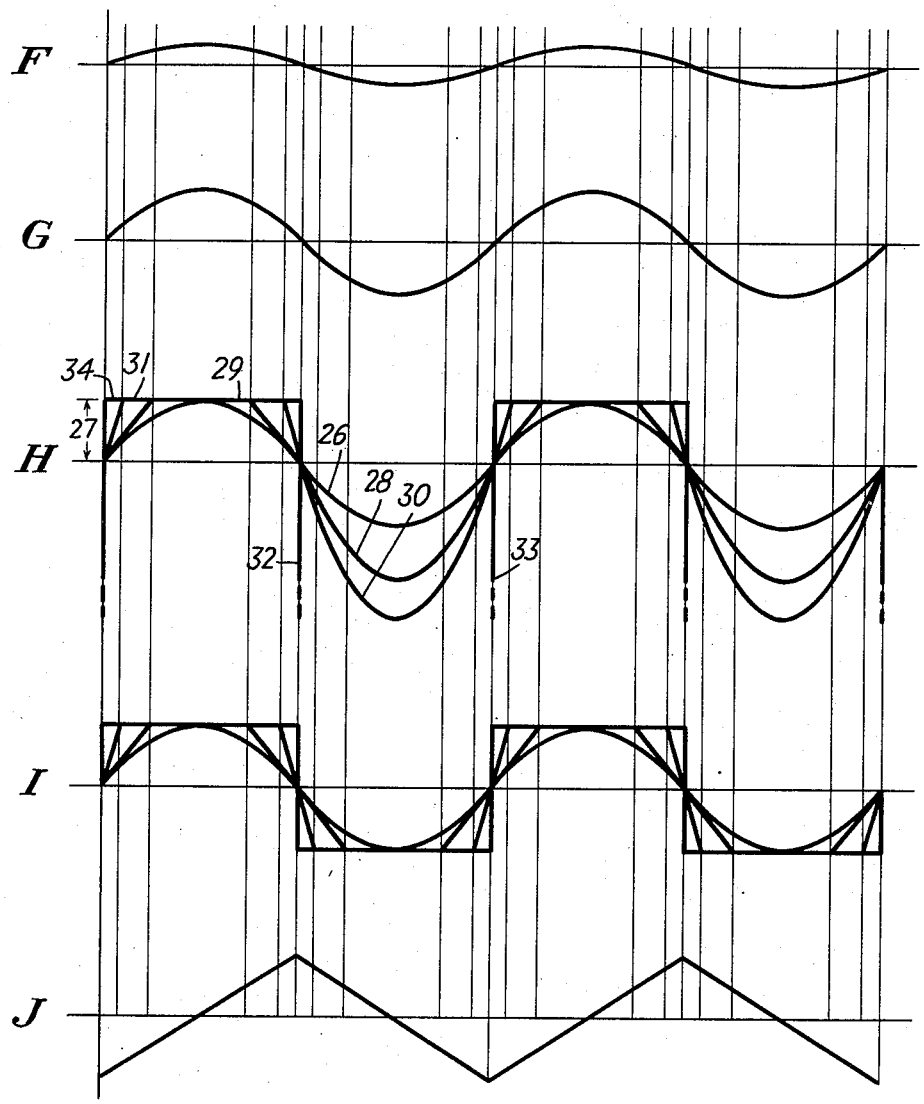

The invention will be more fully understood from the following specification when read in connection with the accompanying drawings in which Fig. 1 is a diagrammatic circuit of one embodiment of my invention and Fig. 2 is a series of curves of wave-forms illustrating the operation of the embodiment shown.

In the prior art, so-called square-wave generators have employed saturation characteristics of thermionic tubes which characteristics are well known to be undependable and tend to change from time to time. While some of these prior art devices are termed "generators," they, in some cases, are not generators but converters in that they require an external source of fundamental frequency.

Further, in the prior art devices depending upon saturation characteristics of thermionic tubes, the amplitude characteristics of these devices may change during operation and in some cases distort the output wave shape to such an extent that it may not in fact be flat-topped. Further, these devices require a large number of tubes and the frequency stability depends, as well as does the calibration values, upon the accuracy of the external source of alternating current frequency.

In the present invention, the stability of the internal fundamental frequency source may be easily made of an order of .01 per cent and the amplitude is constant with constant plate voltage, within the limits of experimental measurement.

Considerable amounts of power may be drawn from the output circuit, if desired, and an external source of fundamental frequency may be used. An external source of frequency may be used to synchronize the internal source of fundamental frequency, as will be understood by those skilled in the art to which this invention appertains.

The device operates as an oscillator when the self-contained source of fundamental frequency is employed and operates as an amplifier when an external source of fundamental frequency is used as the input wave-form. When the external source of fundamental frequency is used to synchronize the internal source of fundamental frequency, the device then operates as a synchronized oscillator.

In the description which follows, the term "oscillator" is not necessarily distinguished from the term "amplifier," as an oscillator is caused to oscillate only because of its ability to operate as an amplifier.

Referring to Fig. 1, the circuit enclosed within the area circumscribed by the dotted lines identified by A, represents a conventional type of band-pass filter having condensers 1, 2, 3, 4, 5 and 6 which may be used to tune the coupled coils 7 and 8 by means of switches 9, 10, 11, 12, 13 and 14 to different frequency-band centers. 15 is a load resistance which is utilized in some cases.

The circuit enclosed within the area circumscribed by the dotted lines identified by B, represents a conventional push-pull high gain resistance-capacitance-output coupled amplifier.

While the push-pull arrangement is illustrated in the present embodiment, it will be obvious to those skilled in the art that the push-pull arrangement is not essential to the proper functioning of the device and that the elements shown in half of this diagram utilizing the elements of one tube and its connected circuit, suffices to incorporate the embodiment of my invention.

By the use of the term "resistance-capacitance-coupled amplifier," no exclusion is intended of the use of impedance elements in one or both of the resistive members used in the coupling circuit. The term "resistance-capacitance coupling" is used to cover any other equivalent elements which function to produce the combinations and operations described in the claims.

The circuit enclosed within the area circumscribed by the dotted lines identified by C, represents a convetnional Class AB amplifier, or under a preferred operating set of conditions, the bias of these tubes is adjusted more nearly to that used in detector operation rather than in ordinary Class AB operation.

Likewise, push-pull operation is not essential to the embodiment of my invention and half of this circuit may be effectively used. In this case the circuit may be set to lose its push-pull classification and become in fact a detector circuit by reason of the bias voltage used.

In the specification and claims the term "Class AB operation" is used to include the single tube or detector operation of the circuit. In other words, Class AB operation as herein employed, is used to mean a tube in which plate current flows for less than one-half cycle, per half cycle, whether one tube is used or push-pull operation is employed.

Blocking condensers 16 and 17, together with resistors 18 and 19 constitute a resistance stabilized feed-back circuit from the amplifier enclosed within C. This feed-back circuit may be closed by means of switches 20 and 21.

The input terminals D and E may be connected to an external source of fundamental frequency, if and when desired, either to operate the device as a converter of sinusoidal voltages into square-wave or triangular voltages of output, or these input terminals D and E may be used as points of injecting synchronizing voltages, as will be hereinafter explained.

The operational characteristics of this invention are principally distinguished from those of the prior art by reason of the coupling characteristics between circuits B and C and the operation of the present embodiment will now be described when functioning as a device having a self-contained source of fundamental frequency.

While the combined appearance of circuits A, B and C resemble a two-stage resistance stabilized audio frequency oscillator as commonly employed to produce pure sine waves in the output circuits, the structural characteristics of this invention are such as to destroy the sinusoidal form of the voltage in the input circuit rather than preserve it, hence, operates in a marked contrast with its apparently related device.

In the present device the coupling resistors 22 and 23 have a very high impedance as compared to the cathode-grid impedance of tubes 24 and 25 when the grids of the said tubes are drawing current. As a preferred structure, the current limiting characteristics of resistors 22 and 23 should have at least ten times the impedance of that of the cathode grid circuits of tubes 24 and 25 when the cathode grid circuit is drawing current.

In the operation of the device as a self-contained source of fundamental frequency it will be convenient to assume that a sinusoidal wave-form of a frequency in the center of the pass-band of filter enclosed within A, is present across the resistor 15, Fig. 1, and such a wave-form is illustrated along abscissa F, Fig. 2. By reason of the high Q filter circuit employed in the diagram enclosed by A, an increased amplitude voltage wave of a sinusoidal form appears at the input terminals D—E, Fig. 1, as illustrated along the abscissa G, Fig. 2.

The ability of the high-gain resistance-capacitance coupled amplifier enclosed within B to maintain this sinusoidal voltage wave-form across its output resistors 22 and 23 depends upon the entire absence of grid current in tubes 24 and 25. The voltage which is now assumed to appear across resistors 22 and 23, Fig. 1, is illustrated along abscissa H, Fig. 2, by the curve 26. The height 27 along the ordinate direction of this curve represents the bias voltage value of tubes 24 and 25 and since curve 26 is not greater than this bias value the sinusoidal character of the input voltage at D—E is maintained in resistors 22 and 23.

However, when the sinusoidal voltage at D—E is raised such that the amplified voltage in 22 and 23 is raised to the value illustrated by curve 28, Fig. 2, the amplitude of the positive lobe cannot rise substantially above the amplitude 27 because for all voltages in excess of 27 the cathode-grid impedance of tube 24 functions as a practical short circuit for this excess voltage and produces the flat top illustrated by 29, Fig. 2. That is, for instantaneous values of grid voltages less than the grid bias voltage, the cathode-grid impedance is infinite or functions as an open circuit across the grid resistors and for all instantaneous values of grid voltages in excess of the grid bias voltage, the cathode-grid impedance is so low that it functions substantially as a short circuit for the excess voltage and for the excess voltage only. If the voltage across 22 and 23 is further raised to a value such as illustrated by curve 30, the positive lobe is further flattened, as illustrated at 31. The instant at which the curve begins to flatten is a matter of instantaneous value and begins as soon as the grid draws any appreciable current. For a much higher voltage at 22 and 23, such as illustrated by the discontinuous curve shown by lines 32 and 33, there will be produced a further flattening of the positive lobe as shown at 34, as will be understood by those skilled in the art.

The curve shown along abscissa H represents the operation of a single tube such as 24. The negative sinusoidal lobes being only negative grid voltage values do not produce any plate current, the plate current being represented by the positive lobes alone. It is obvious to those skilled in the art that these positive lobes of a single tube may be used as a square-wave generator by the introduction of a constant voltage bias in the output circuit. It is believed that such obvious expediencies do not warrant special illustration and description.

The curve shown along abscissa I, Fig. 2, represents the combined push-pull operation already described for a single tube, as will be understood by those skilled in the art.

Referring to Fig. 1, if the circuits including condensers 35 and 36 are closed by means of switches 37 and 38 with the different selection of capacitance for these condensers, various different shapes of triangular wave-forms can be obtained, and with an optimum selection of capacitance, an isosceles form of triangular wave may be obtained such as illustrated along abscissa J, Fig. 2.

Curves shown in I and J represent the integral and differential, one or the other, and therefore represent a systematic wave shift of the harmonic components, hence producing a device which has an increased usefulness in the study and development of audio circuits.

The operation above described has been based on the assumption of a sinusoidal voltage being applied across resistor 15, Fig. 1. If switches 20 and 21 are closed and feed-back is obtained from amplifier C, a voltage will be produced across 15 proportional to the output voltage of amplifier C. With the proper selection of feed-back resistors 18 and 19 the wave-form of the output voltage of amplifier C may be produced across resistor 15. In this case the voltage across resistor 15 is not sinusoidal as originally assumed but is of whatever wave-form is produced in the output circuit. This complex wave-form is reduced to a single frequency by means of the filter A so that when the complex wave-form introduced at 15 has been filtered, it arrives at the terminals D—E in a sinusoidal form and the device then operates as a resistance stabilized oscillator with a filtered input and in accordance with the operation already set forth.

One distinguished structural characteristic that the present embodiment possesses in contrast with the ordinary audio frequency resistance stabilized oscillator is that in the case of the prior art audio frequency oscillators the ouput wave-form is purely sinusoidal in shape and may be fed back in its output wave-form directly into a simple oscillatory circuit. In the case of the present invention, the output wave-form being never sinusoidal, cannot be fed back into a simple oscillatory circuit but must be adequately filtered before it is reintroduced into the input circuit of the oscillator. The type of oscillator shown in the present embodiment will not function with a resistance feed-back into a conventional grid oscillator circuit.

If the switches 9, 10, 11, 12, 13, 14, 20 and 21 are open, the filter circuit and the feed-back circuit is eliminated from the operation, and it will be obvious to those skilled in the art, that if a sinusoidal voltage is applied to the input terminals D and E, Fig. 1, the device will necessarily operate as a wave-form converter, since the function of the structure eliminated by the opening of the above enumerated switches, functioned only to produce a sinusoidal voltage at the input terminals D—E. Thus, the device becomes, in the embodiment shown in Figure 1, in effect a wave-form converter.

It will be obvious to those skilled in the art that the form of wave applied at the input terminals D—E does not have to be sinusoidal or even approaching that, the only requirement being that under amplification by amplifier B the instantaneous value of the voltage produced across resistors 22 and 23 must at no time, after the initial rise and before the final fall, be less than the bias voltage of amplifier C, Fig. 1, as illustrated by the height 27, Fig. 2.

Those skilled in the art of constructing oscillators for synchronization with other sources of alternating current frequencies will appreciate that when the embodiment shown in Figure 1 is operating as a self-contained source of alternating current frequency, that is under oscillator operation, the proper injection of a small amount of alternating current near the internal oscillator frequency and at terminals D and E can be made to cause the internal oscillator to synchronize with the voltage injected at D and E.

When the present embodiment functions as an oscillator it possesses all of the desirable characteristics of stability that a well designed resistance stabilized audio oscillator manifests. By the proper selection of tubes, the attainment of suitable Q in the filters and the proper amount of feed-back resistance, a frequency stability of the order of .01 per cent may be attained, as is common practice in the art of building conventional resistance stabilized audio frequency oscillators.

By selective calibrated adjustment on filter A for the cardinal frequency points desired, pushbutton control for these cardinal points may be attained with the said frequency stability.

The amplitude of the output and therefore the amplitude of the embodiment as a whole, is stabilized by the grid impedance relation between the resistors 22 and 23 with tubes 24 and 25, as has been set forth.

In the above description I have taught the use of one embodiment of my invention and have simplified the exposition for clearness in teaching, but the scope of my invention is set forth in the claims hereunder.

What I claim is:

1. A system for generating electrical oscillations comprising a voltage divider member, a first tuned circuit comprising a series connected inductance and capacity connected across spaced positions on said member, a parallel tuned circuit coupled to said first tuned circuit, an amplifier coupled to said parallel tuned circuit, the structural form of the grid circuit of said amplifier causing greater distortion in the output circuit thereof for waves of one polarity than for waves of the opposite polarity, and feed-back means applying the output of said amplifier across said member.

2. A system for generating electrical oscillations comprising a voltage divider member, a first tuned circuit comprising a series connected inductance and capacity connected across spaced positions on said member, a parallel tuned circuit coupled to said first tuned circuit, a push-pull amplifier coupled to said parallel tuned circuit, the structural form of the grid circuit of said amplifier causing flattened waves in the output circuit thereof for both polarities of said waves, and feed-back means applying said flattened output waves of said amplifier across said member.

MONTFORD MORRISON.

REFERENCES CITED

The following references are of record in the file of this patent:

UNITED STATES PATENTS

| Number | Name | Date |
| --- | --- | --- |
| 2,230,926 | Bingley | Feb. 4, 1941 |
| 2,268,872 | Hewlett | Jan. 6, 1942 |
| 2,275,452 | Meacham | Mar. 10, 1942 |
| 2,277,000 | Bingley | Mar. 17, 1942 |
| 2,308,752 | Hadfield | Jan. 19, 1943 |
| 2,394,018 | Shank et al. | Feb. 5, 1946 |
| 2,419,772 | Gottier | Apr. 29, 1947 |